(12) United States Patent
Tavantzis

(10) Patent No.: US 7,419,024 B1
(45) Date of Patent: Sep. 2, 2008

(54) WHEELCHAIR ACCESSIBLE TRIKE

(76) Inventor: Christ Soter Tavantzis, 3200 Mary St., Apt. 10, Coconut Grove, FL (US) 33133

( * ) Notice: Subject to any disclaimer, the term of this patent is extended or adjusted under 35 U.S.C. 154(b) by 0 days.

(21) Appl. No.: 11/844,055

(22) Filed: Aug. 23, 2007

(51) Int. Cl.
*B62D 61/06* (2006.01)

(52) U.S. Cl. .................. 180/210; 180/211; 180/215; 180/53.6; 280/62

(58) Field of Classification Search .............. 280/62, 280/304.1, 304.2; 180/210, 211, 215, 217, 180/53.6, 53.61
See application file for complete search history.

(56) References Cited

U.S. PATENT DOCUMENTS

| 4,449,602 | A | * | 5/1984 | Dittmann, Jr. | 180/215 |
| 4,573,549 | A | * | 3/1986 | Pankow | 180/216 |
| 4,592,441 | A | * | 6/1986 | Marier et al. | 180/217 |
| 4,757,868 | A | * | 7/1988 | Cresswell | 180/11 |
| 5,806,622 | A | * | 9/1998 | Murphy | 180/210 |
| 7,090,234 | B2 | * | 8/2006 | Takayanagi et al. | 280/124.103 |
| 7,311,167 | B2 | * | 12/2007 | Takayanagi et al. | 180/215 |
| 2004/0040770 | A1 | * | 3/2004 | Takayanagi et al. | 180/210 |
| 2005/0077098 | A1 | * | 4/2005 | Takayanagi et al. | 180/215 |

\* cited by examiner

*Primary Examiner*—Toan C To
(74) *Attorney, Agent, or Firm*—Sanchelima & Associates, P.A.

(57) ABSTRACT

A motortrike designed to allow individuals that use a wheelchair to independently operate it. The motortrike comprises a wheelchair frame assembly that secures onto a motorcycle frame, a movable platform assembly a transmission assembly, a power transfer assembly and a rear wheel assembly. An individual in a wheelchair may ride the wheelchair onto the platform assembly and lock the wheelchair thereon. A threshold ramp assembly is mounted to the rear of the platform assembly to minimize the transition from ground level to the platform member. The individual may operate the motortrike as a motor vehicle while transporting the wheelchair.

4 Claims, 6 Drawing Sheets

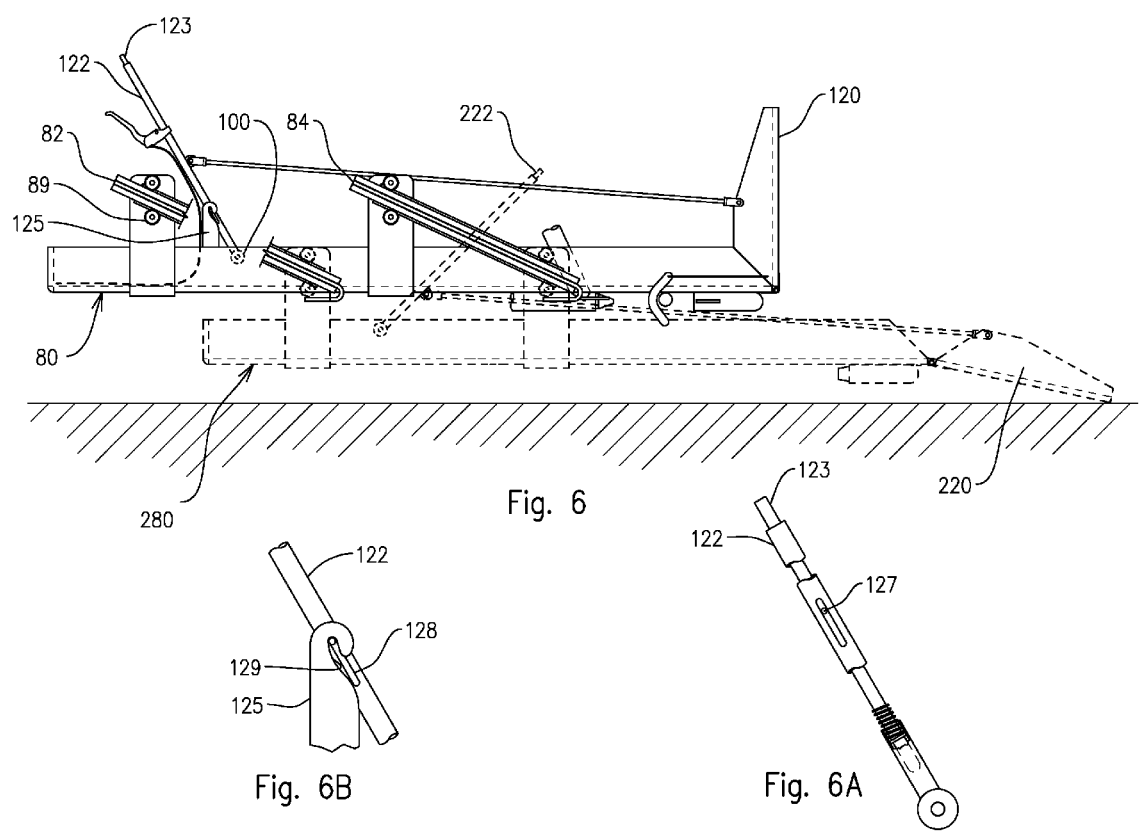

WHEELCHAIR ACCESSIBLE TRIKE

BACKGROUND OF THE INVENTION

1. Field of the Invention

The present invention relates to motor vehicles, and more particularly, to trikes having wheelchair accessibility.

2. Description of the Related Art

Defined as a two-wheeled motor vehicle resembling a heavy bicycle, motorcycles have been used as an exciting form of transportation for many years. Motorcycles have taken various shapes in the past, some even including a sidecar for an additional passenger and/or storage. In recent years, a variation of a motorcycle has been developed, called a trike. A trike is defined as a three-wheel motorcycle.

Several designs for motorcycles and trikes teach motor vehicles that are designed for individuals without physical limitations. There are no trikes to the best of applicant's knowledge, designed for an individual in a wheelchair that comprises a movable platform assembly and wheelchair locking assembly for the wheelchair. The instant invention, defined as a wheelchair accessible trike, is designed to allow individuals that use a wheelchair, to independently operate the trike. Or with an able individuals as an operate allowing a second individual in an wheelchair be a passenger on this trike. This trike can be operated by an able-bodied and or individuals with physical limitations with or without a wheelchair.

SUMMARY OF THE INVENTION

It is one of the main objects of the present invention to provide a wheelchair accessible as a driver or a passenger in this trike designed for an individual in a wheelchair.

It is another object of this invention to provide a wheelchair accessible trike designed to allow individuals that use a wheelchair and or individuals with physical limitations with or without a wheelchair, to independently operate the trike.

It is another object of this invention to provide a wheelchair accessible trike comprising a frame assembly, movable platform assembly and wheelchair locking assembly for the wheelchair.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 illustrates an elevational view of the movable platform and locking assemblies with the movable platform assembly in phantom representing the released position.

FIG. 6a illustrates a detailed elevational view of release lever 122 of the present invention.

FIG. 6b show a close-up elevational view of hook bracket 125 of the present invention.

DETAILED DESCRIPTION OF THE PREFERRED EMBODIMENT

Figure 1:
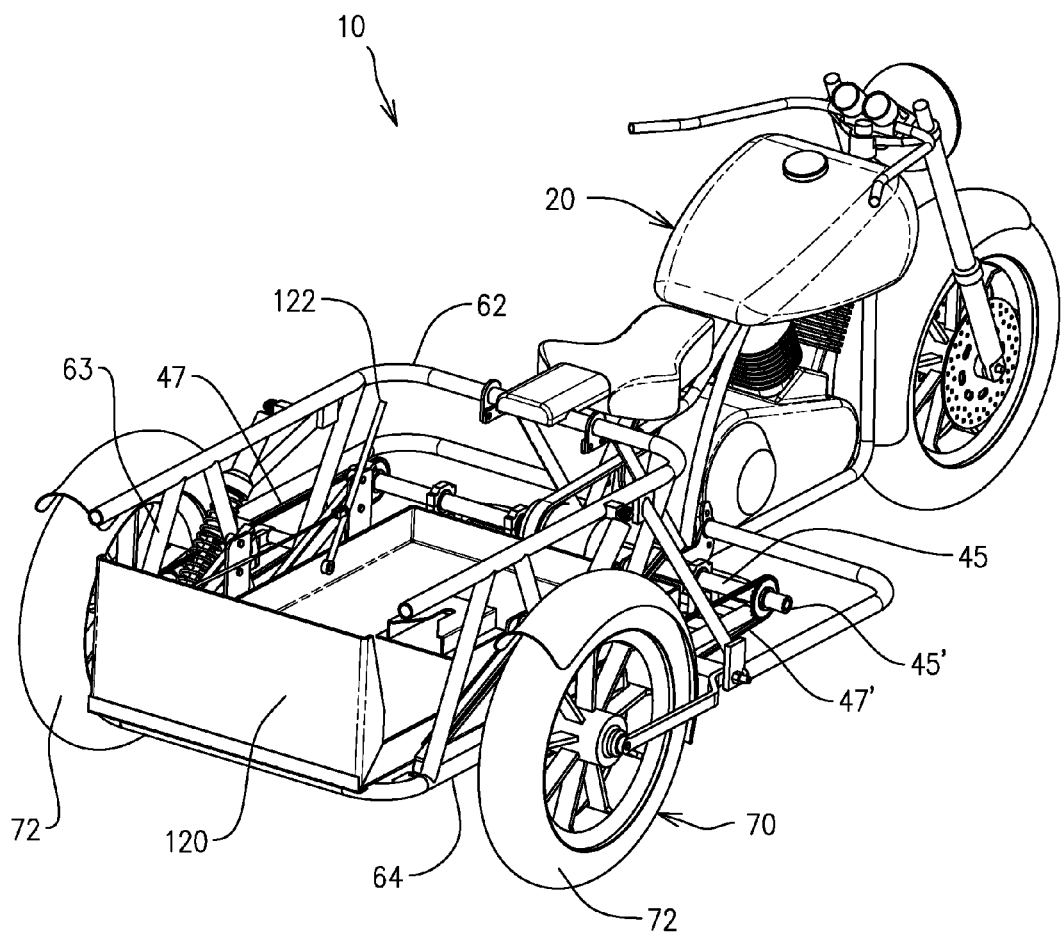
FIG. 1 represents an isometric view of one of the embodiments of the present invention, referred to as the wheelchair accessible trike.

Referring now to the drawings, where the present invention is generally referred to with numeral 10, it can be observed that it basically includes motortrike body 20, wheelchair frame assembly 60, power transfer assembly 40, movable platform assembly 80, and rear wheel assembly 70.

As seen in FIG. 1, motortrike body 20 comprises all elements of a standard stock motorcycle, with the exception of a rear wheel assembly. The illustrated motortrike body 20 is a motorcycle model 1992 FRXP manufactured by Harley-Davidson, Inc. in Milwaukee, Wis., USA. Other equivalent motorcycles can also be used. Additionally, snowmobiles and all-terrain vehicles can be retrofitted as the motorcycles.

Figure 2:
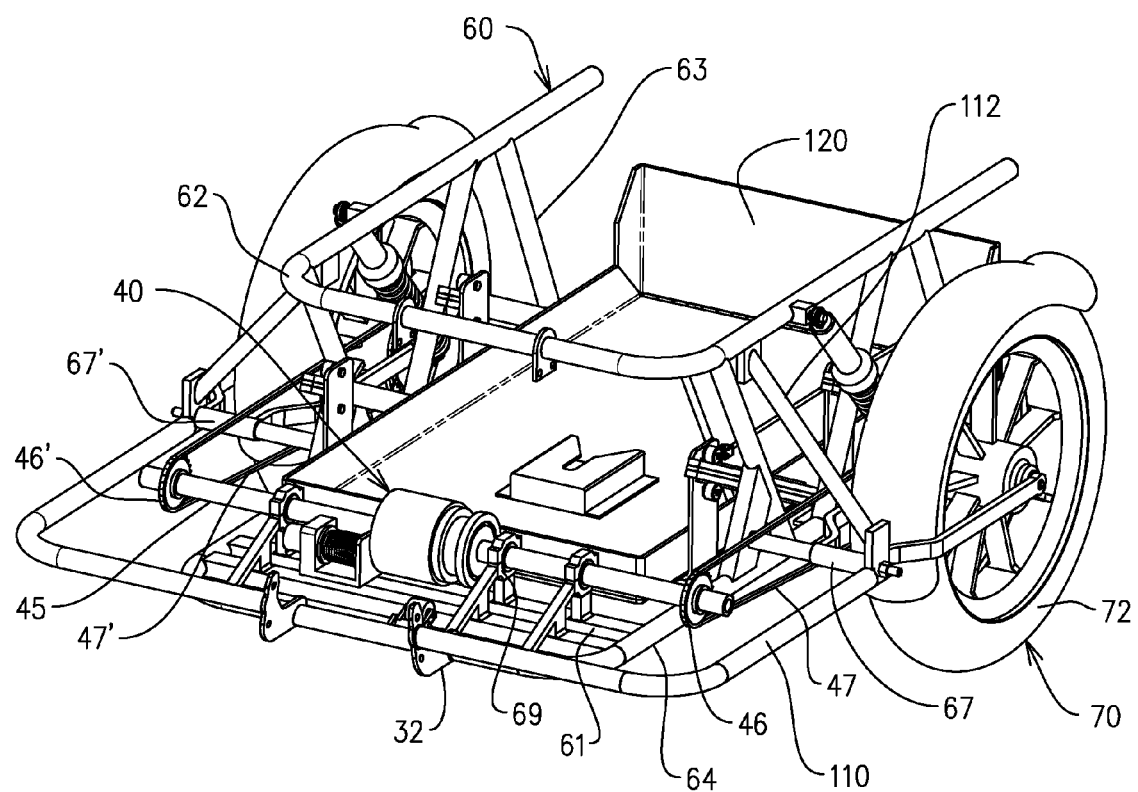
FIG. 2 shows an isometric view of the trike frame assembly.

As seen in FIG. 2, motortrike frame assembly 60 includes connecting plates 32 mounted to the front of U-shape lower frame member 64, as seen in FIG. 2. U-shape upper frame member 62 is mounted at a parallel and spaced apart relationship with respect to member 64 by cross-members 63. Supporting box 65 is mounted to member 64 and cross-member 63 to provide secured support to swing arm axle 67. Rear wheel assembly 70 is pivotally mounted to swing arm 67. Shock absorber assembly is connected to member 62 to provide a coil over shock absorber function to rear wheel assembly 70. Transversal support members 61 and 61' support bearing assemblies 69 for shaft 45. Vertical strut 112 connects the distal end of swing arm axle 67' to upper frame 64. Forward or horizontal strut 110 connects swing arm axle 67' to connecting plate 32.

Figure 3:
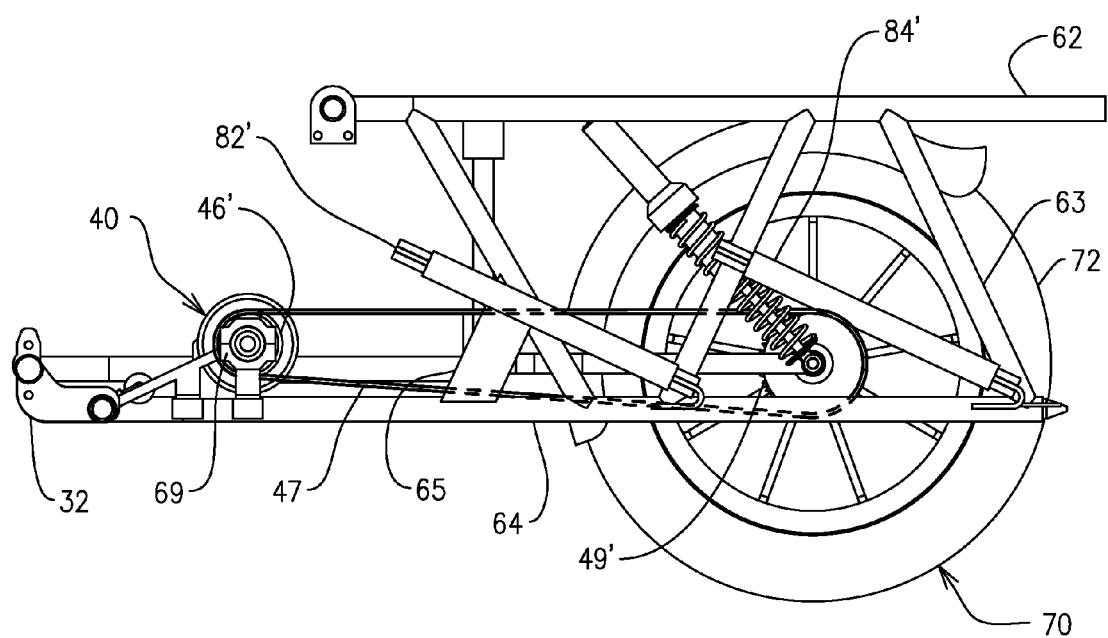
FIG. 3 illustrates a side view of the frame assembly (without the movable platform) and power transfer assembly.
Figure 4:
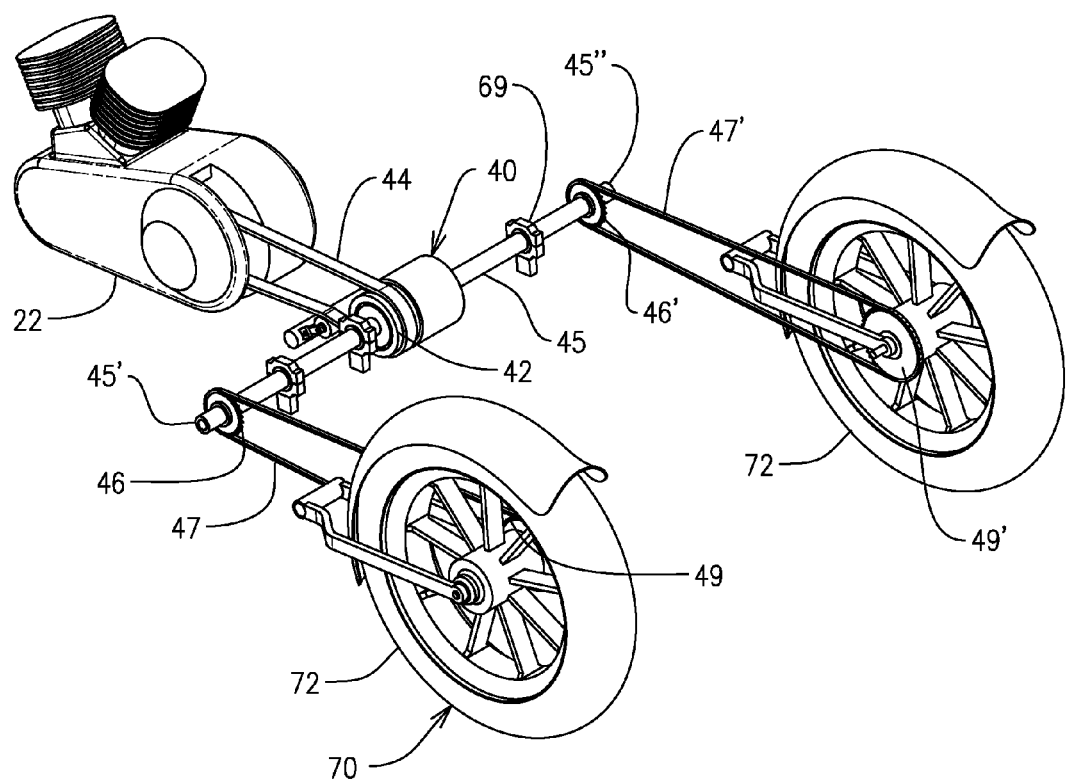
FIG. 4 illustrates a side isometric view of the power transfer assembly, the side chains and secondary belt connected to the power transfer assembly, and limited-slip differential.
Figure 5:
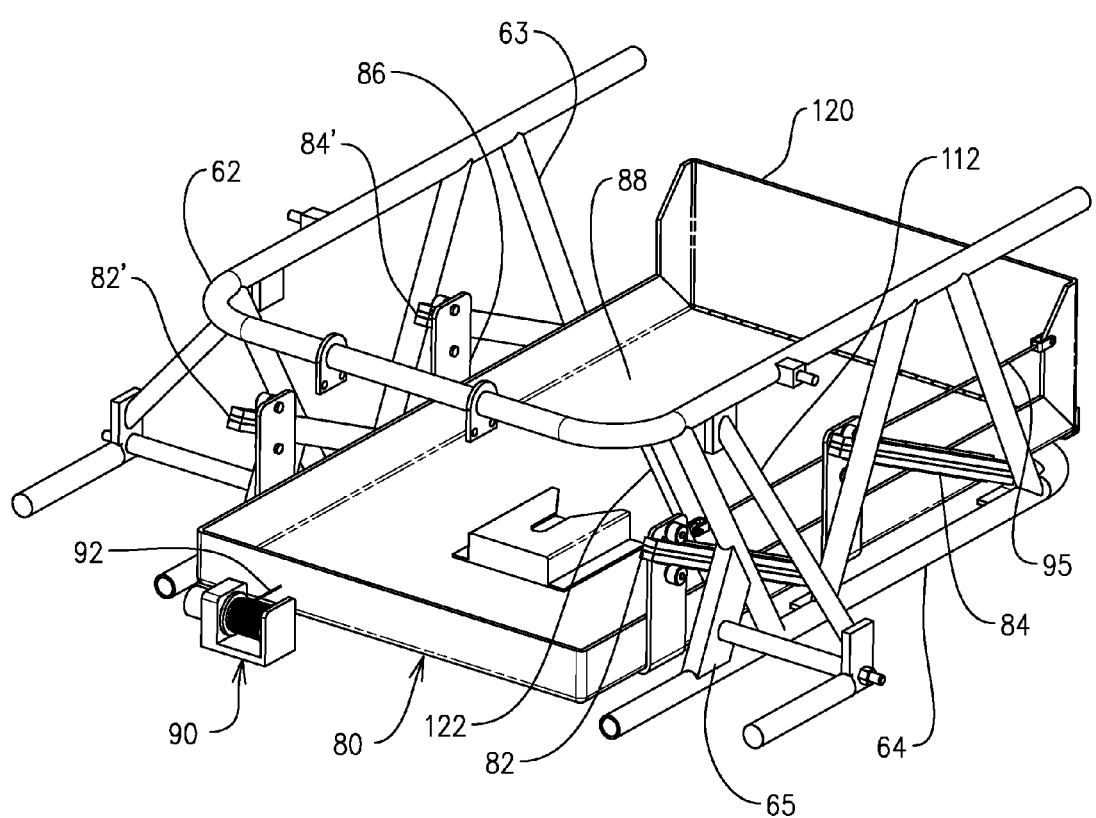
FIG. 5 illustrates a side front view of the movable platform assembly and the winch assembly.

As seen in FIGS. 3 and 4, power transfer assembly 40 comprises belt drive pulley 42 that is driven by secondary belt 44. Additionally, power transfer assembly 40 includes power transfer shaft 45 that extends coaxially outwardly in both directions with ends 45' and 45". Sprockets 46 and 46' are mounted to ends 45' and 45", respectively. Chain 47 and 47' are trained over sprockets 46 and 46' to impart rotational movement to rear wheel sprockets 49 and 49', which turn wheels 72 respectively, as best seen in FIG. 4.

Power transfer assembly 40 is positioned forward from wheel assemblies 70. In one of the preferred embodiments, as shown in FIG. 4, assembly 40 is located behind transmission assembly 22 and in front of platform member 86. The position of assembly 40 is a feature that permits platform member 86 to travel a reasonable distance down to ground level for easy access.

Movable platform assembly 80 comprises platform member 88 mounted upon four platform support members 86. Platform support members 86 ride on forward runners 82 and 82' and rear runners 84 and 84'. Platform support members 86 are preferably implement with an L-shape bracket with rollers 89 and 89'. Runners 82; 82'; 84 and 84' pass between rollers 89 and 89' thereby supporting members 86 which in are mounted to platform member 86. Runners 82; 82'; 84 and 84' include several through openings 83. Runners 82; 82'; 84 and 84' are mounted to frame assembly 60. An electric motor or winch assembly 90 is used to pull and release movable platform assembly 80 through steel cable 92 which is mounted to the front of platform assembly 80.

Wheelchair lock assembly 130 has two mating parts. Assembly 130 is commonly referred to as an "easy-lock" mechanism. Part 132 is mounted to upperside of platform assembly 88. Part 132 mates with a cooperative part for releasably locking a wheelchair (not shown) to keep the latter in place.

Locking mechanism 100 is designed to keep movable platform assembly 80 in place with respect to runners 82; 82'; 84 and 84'. The lowest position is shown as platform assembly 280. Threshold ramp assembly 120 is kept at a substantially perpendicular position with respect to the plane of platform member 88 in one extreme position. Assembly 120 is pivotally mounted to the rear of platform assembly 80 and it is released and distended to the other extreme position 220 by release lever 122 and rod 95. Lever 222 show the released position. Locking mechanism 100 includes rod 123 coaxially housed within tubular lever 122. Locking pin 127 is perpendicularly mounted to rod 123 at a cooperative predetermined location, as best seen in FIG. 6*a*. Pin 127 passes through slot 128. Locking pin 127 coacts with bay 129 in hook bracket 125 to releasably lodge the former.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheelchair accessible trike, comprising:
   A) a motorcycle assembly including a front fork, handle bars, first wheel assembly, motorcycle frame, motor, transmission, gas tank and seat assemblies;
   B) a frame assembly having an upper U-shape frame member and a lower U-shape frame member kept at a spaced apart relationship with respect to each other by a plurality of cross members, and further including means for connecting said frame assembly to said motorcycle frame;
   C) second and third wheel assemblies mounted to said frame assembly at a parallel and spaced apart relationship with respect to each other;
   D) platform means including a platform member movable between two extreme horizontal planes said platform means including forward and rear ends;
   E) means for releasably locking said platform member in at least one position with respect to said guide members;
   F) means for pulling and releasing said platform along the plane defined by said first pair of guide members so that a wheelchair can be positioned on said platform by an unaided wheelchair user thereby permitting said user to operate said motorcycle assembly; and
   G) power transfer means for transmitting the rotational energy from said transmission to said second and third wheel assemblies wherein said power transfer means is located between said transmission assembly and said forward end.

2. The trike set forth in claim 1 wherein said platform means includes a substantially flat platform member, front and rear pairs of runner guide members cooperatively mounted to said frame assembly and each pair having its guide members positioned at opposite and parallel spaced apart relationship with respect to each other, said guide members positioned at a predetermined angle with respect to said lower U-shape member, and four support members perpendicularly mounted to said platform at predetermined locations and each of said support members including a pair of rollers cooperatively mounted thereon to sandwich said guide members thereby permitting said platform to move along said guide members.

3. The trike set forth in claim 2 wherein said power transfer means transmits the rotational energy to said second and third wheel assemblies independently full limited slip capabilities.

4. The trike set forth in claim 3 further including:
   H) a threshold ramp assembly pivotally mounted to said rear end and movable between two extreme positions so that a wheelchair can ride over said ramp assembly for an easy transition from the ground level.

\* \* \* \* \*